Aug. 14, 1945.   E. R. DOUGLASS   2,382,618
GEOMETRICAL INSTRUMENT
Filed Nov. 6, 1943   2 Sheets-Sheet 1

INVENTOR.
Edward R. Douglass.
BY Wilfred E. Lawson

Aug. 14, 1945.   E. R. DOUGLASS   2,382,618
GEOMETRICAL INSTRUMENT
Filed Nov. 6, 1943   2 Sheets-Sheet 2
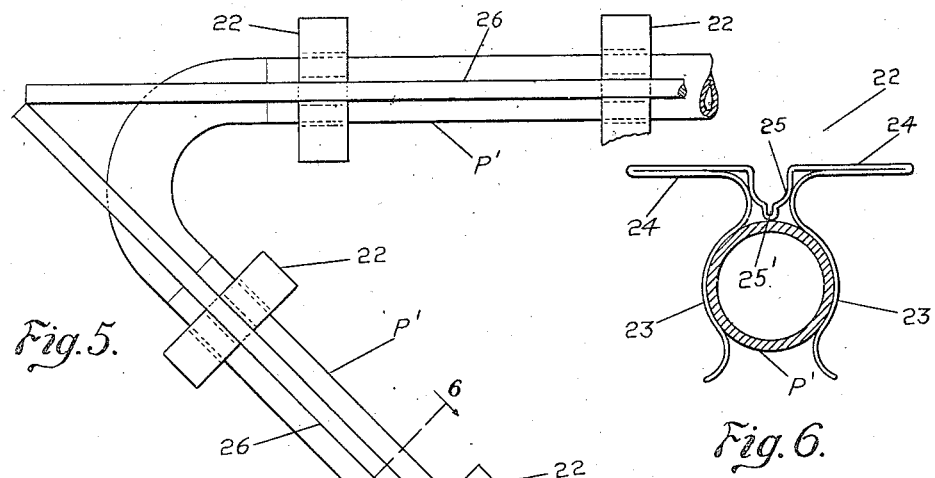
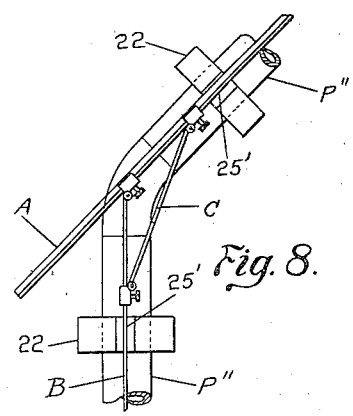
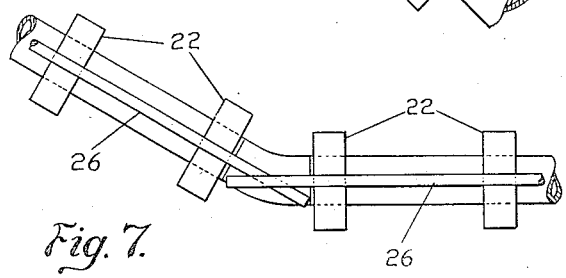
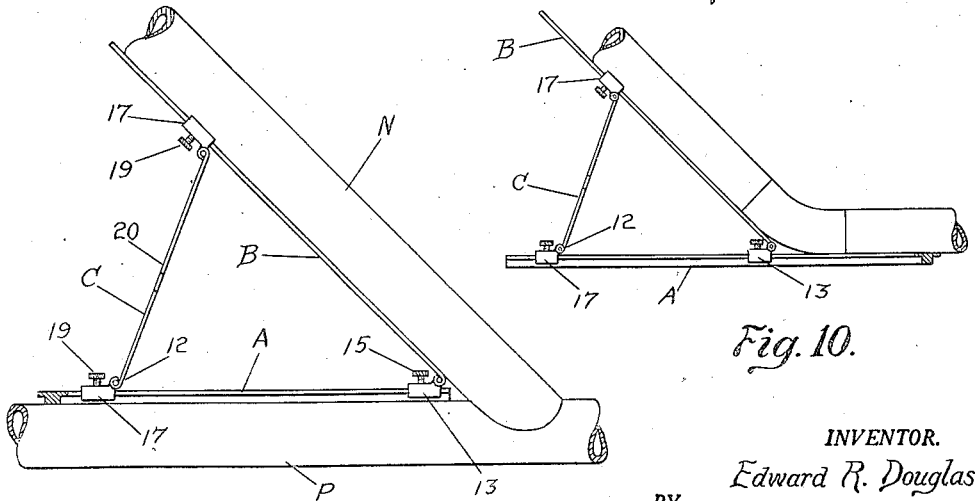
INVENTOR.
Edward R. Douglass.
BY
Wilfred E. Lawson Patented Aug. 14, 1945

2,382,618

UNITED STATES PATENT OFFICE 2,382,618

GEOMETRICAL INSTRUMENT

Edward R. Douglass, Eckman, N. Dak.

Application November 6, 1943, Serial No. 509,284

6 Claims. (Cl. 33—98)

This invention relates generally to the class of geometrical instruments and pertains particularly to improvements in gages for measuring angles.

A principal object of the present invention is to provide a simple easily handled and adjusted gage for measuring or determining various angles, the gage being so constructed and arranged that it may be easily and quickly adjusted for measuring or determining either acute or obtuse angles.

Another more specific object of the invention is to provide an angle measuring or determining gage designed primarily for, but not necessarily restricted to, use in the operation of joining pipes, whereby, when a coupling nipple is to be set into a pipe at a specified angle the operation of fixing the nipple at the correct angle in an aperture in the wall of the pipe, may be carried out easily and quickly with the positive assurance that the angle specified has been accurately obtained.

Another object of the invention is to provide a gage device for measuring angles, comprising three relatively adjustable elongated members which are so connected together that two of the members may be easily and quickly set, one with relation to the other, to define a desired angle so that the setting of two structural members such as a pair of pipes, beams or the like may be readily made to a specified angle or whereby the angle of two members so set can be easily and quickly determined.

Another object of the invention is to provide a gage instrument which is so designed that it may be readily employed for finding the center of a pipe when such operation is necessary.

Still another object of the invention is to provide a means for extending or projecting the center lines of two angularly related pipes or other members where such members may be joined by a curved elbow, to facilitate setting the members with the connecting elbow at a desired angle or for determining the angular relation of such members.

Other objects and advantages of the invention will become apparent as the description of the same proceeds and the invention will be best understood from a consideration of the following detailed description taken in connection with the accompanying drawings, it being understood that slight changes and modifications may be made in the invention so long as such changes or modifications do not materially depart from the spirit of the invention as expressed in the appended claims.

In the drawings:

Figure 5 illustrates in plan the angle projecting means for use with the gage.

Figure 6 is a sectional view on the line 6—6 of Figure 5 with the rod removed.

Figure 7 is a view illustrating the application of the angle extending means for measuring an obtuse angle.

Figure 8 is a view illustrating the method of mounting the angle gage directly upon the rod supporting saddles.

Figure 9 illustrates the method of measuring an acute angle with the gage.

Figure 10 illustrates the method of measuring an obtuse angle with the gage.

Figures 1, 2, 3, 4:
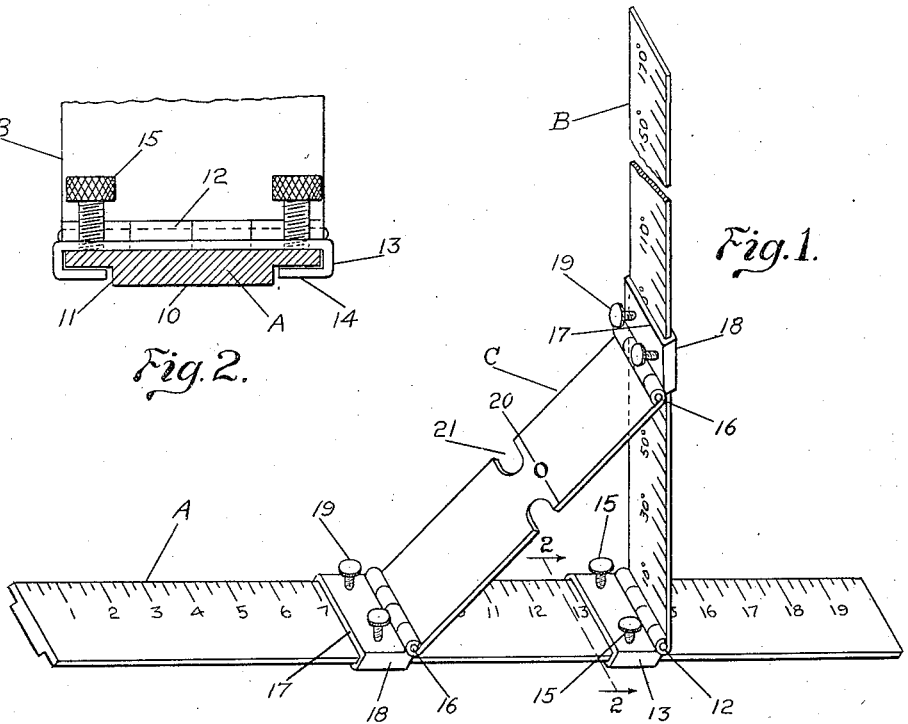
Figure 1 is a view in perspective of the angle gage constructed in accordance with the present invention.
Figure 2 is a transverse section on the line 2—2 of Figure 1.
Figure 3 is a plan view of the folded gage.
Figure 4 is a view in edge elevation of the folded gage.

The present gage device and center projecting means was designed primarily for use in assembling pipes wherein various angular connections have to be made and connecting or coupling nipples are required to be set into a pipe at a specified angle therefore the following description will be directed particularly to this use although it is to be understood, and it will be readily apparent, that the device may be used in numerous other operations.

In the construction of buildings, ships or other structures where the installation of pipes and tubes is a part of the work involved, connections between such pipes and tubes must be made at different specified angles and at the present time no satisfactory instrument is in use for easily and quickly setting a nipple in a pipe opening at the specified angle where it is temporarily secured or "spotted," to be subsequently permanently secured by a welder.

The present invention provides a simple and easily adjustable tool or instrument which can be readily set to the angle at which a nipple is to be secured or coupled in a pipe and placed in position on the pipe adjacent the opening in which the nipple is to be secured so that the nipple may be disposed against a side of the gage tool and maintained at the proper position while it is being temporarily secured in the opening.

In accordance with the present invention the gage instrument comprises the three bars A, B, and C which bars may be designated respectively the base, side and coupler bars, such bars being constantly joined together to form a triangular frame, the outer sides of the base and side bars of which are employed for measuring or determining certain angles while the outer and top side of the side and base bars are employed for the determination or setting of other angles.

The three bars A, B and C, of the device are formed of flat material, preferably metal, of substantial width. While the width may be varied as desired in the making of instruments of various sizes it is found that a width of about one inch or one inch and a quarter is most convenient as this gives to each of the members A and B, a sufficient width to facilitate setting the instrument upon a work table where it will maintain an upright position.

The base bar A has formed along its underside the central relatively wide rib 10 upon which the base rests, there being thus formed at each side of the rib the undercut recesses 11 which facilitate the ready movement lengthwise of the base bar of the hinge slides of the side B and coupler C as illustrated.

The top face of the base or the underside or both may be ruled or laid off lengthwise to provide a linear measuring scale.

The base bar has permanently attached to one end by the hinge joint 12, a slide plate 13 having at each side the inwardly turned or reverted fingers 14 which engage around the adjacent longitudinal edge of the base A when such base is inserted between the fingers of the slide as illustrated, such fingers lying in the adjacent recesses 11. Thus it will be seen that this hinge slide and connection between the base and side bars will be free to move lengthwise of the base bar when the latter is resting upon a supporting surface.

The connecting slide or hinge slide 13 is designed to be adjustably secured to the base at any desired position therealong by the set screws 15.

The coupler bar C has permanently hingedly coupled to each end by the hinge 16, a slide plate 17 which has the inturned spaced fingers 18. Each of these plates 17 also carries a pair of set screws 19.

One of the slide plates 17 of the coupler bar is designed to have slidable connection with the base A while the other slide plate has sliding connection with the side bar B so that the coupler bar C extends across the angle formed between the bars A and B as illustrated and either of these slide plates may be permanently secured to the bar with which it is slidably coupled after the plate has been shifted to the desired position upon the supporting bar.

The bar B has the inner side face laid off to provide a degree scale for setting the position of the slide plate 17 on the bar. Also the coupler bar C has a center designating line or marking 20 which is employed in association with the axial center of the hinge 12 for securely setting the bars B and C in position upon the base bar A, the slide plate 17 connected with the side bar B then being shifted to the desired degree marked upon the side bar B so as to produce the desired angle between the bars A and B.

The outer side face of the bar B, may also have a linear measuring scale therealong like the bar A.

The side edges of the coupler bar C are suitably recessed as indicated at 21 so that the three bars may be brought into folded relation as shown in Figure 4 to facilitate the setting of the bars A and C in the manner above stated.

In the use of the instrument, if it is to be set to measure or determine an acute angle as, for example, the angle between a pipe P and a nipple N as shown in Figure 9, the slide 13 is shifted toward that end of the base A which is remote from the coupler bar C until the outer face of the side bar B is flush with such end of the base bar A whereupon the set screws 15 will be secured to hold the slide 13 against movement on the base bar A.

The side bar B will then be swung down and the coupler bar C shifted so that the several bars assume the relation shown in the folded illustration of the instrument in Figure 4 and the coupler bar is then adjusted until the center line 20 is directly above the axial center of the hinge 12 whereupon the set screws 19 of that slide 17 which is upon the base bar A, will be set to hold this slide and the base bar against movement.

The side bar is then swung up, the slide 17 engaged therewith being movable thereon, until the edge of this slide reaches the degree designation upon the degree scale which will indicate the desired angular relation between the outer side of the bar B and the underside of the bar A whereupon the set screws of the last mentioned slide will be secured so as to hold the bars A and B in the desired relation. The point of the angle can then be inserted into the angle between the nipple and the pipe as shown in Figure 9 to determine if the angle is correct or the base may be set upon the pipe P and the nipple placed in the pipe opening and brought to the desired angular position by resting it against the inclined outer face of the bar B after which it may be secured.

If an obtuse angle between two pipe members or any other two members is to be determined the slide 13, and the corresponding slide 17 mounted upon the base bar A, will be shifted to that end of the bar A nearest the coupler C and after setting the coupler bar C to the center of the hinge 12 in the manner previously stated, the bar B may be oscillated until the desired obtuse angle is designated upon the degree scale by the slide plate 17 which is attached to the side bar B. The outer face of the bar B and the top face of the bar A then form the angle faces against which the undersides of the obtusely angled pipe or other members are placed as illustrated in the diagrammatic Figure 10.

It will, of course, be readily apparent that the outer face of the bar B and the top face of the bar A may also be set to form an acute angle for making desired measurements, if desired and also the outer face of bar B and the under side of bar A may be employed for measuring obtuse angles when the bar B is set at that end of the bar A remote from the coupler C and the bar B is oscillated away from the coupler bar C.

Either of the last two described settings for the bars A and B may be employed for determining angles between connected ends of pipes, in conjunction with the improved center line projecting means, about to be described, and members of this center line projecting means are also formed to receive the bars A and B of the gage for determining angles.

At the present time where the ends of two pipes are joined together by a curved coupling or elbow as illustrated in Figure 5, the angle of such pipes is determined by the use of a template. In the shop where such pipes are set up a large number of such templates is kept on hand and the workmen must go through these templates and select the one having the angle desired and this is then used to measure the angle of the pipes.

In accordance with the present invention there are provided a number of resilient pipe engaging clips or saddles generally designated 22. Each of these saddles comprises the two resilient arms 23 and a head plate 24 having a straight flat top and having at its transverse center a rod cradle 25. This cradle is in the vertical plane of the center of the circle defined by the two semicircular clips 23 which are designed to engage over a pipe such as is here shown and designated P'. The bottom of the cradle has formed therein the central slot 25' which also extends across the head parallel to the axial center of the circle defined by the arms 23.

Two of the bar supporting saddles 22 are placed upon each of the angularly related pipes as shown, in longitudinally spaced relation and there is then placed in the alined cradles 25 of each adjacent pair of saddles, a rod 26. These rods are then extended until their outer ends converge to contacting relation as shown whereupon the angle between the rods and consequently the angle of the pipes P', in the vertical plane of the longitudinal center of which the rod lies, may be readily determined by setting the engaged bars A and B so that the outer face of the bar B and the top face of the bar A will have the same angular relation as the convergent rods 26.

In the operation above described the pipes will be lying upon a work table and the saddle can be adjusted so that the center of the cradle will be in the vertical plane of the center of the pipe, by placing a level across the pipe upon the top of the flat head 24, the saddle being turned as necessary upon the pipe until the head is leveled thus bringing the center of the slot 25' in the vertical longitudinal center of the pipe.

It will be readily apparent that where the connected pipes have an obtuse angular relation the rods 26 will be extended into crossed relation as diagrammatically illustrated in Figure 7 and the obtuse angle between the crossed ends of the rods then measured with the gage.

Figure 8 illustrates the method of using the gage to determine an angle between two joined pipes or to set two pipes into a desired angular relation for the connection of an elbow therebetween, where the gage can be used as a direct connecting means between a pair of saddles mounted, each upon one of the pipes. This method makes use of the grooves 25' in mounting the gage on edge over the pipes and with the bars A and B disposed in the vertical plane of the axis of a pipe.

As is clearly shown in Figure 8, where two pipes P'' are shown connected in obtuse angular relation, each pipe has a saddle mounted thereon with the groove 25 in the vertical plane of the longitudinal center of the pipe. If the angular relation of the pipe is presumed to be 135° this can be readily checked by setting the bars A and B of the gage in this angular relation and then placing the gage in position over the pipes with the long edge of each bar in a slot 25' so that the joined ends of the bars lie in the angle of the pipes. It will also be readily apparent that where the pipes are to be assembled in this angular relation for joining by a suitable elbow the gage when arranged with each of the bars located in a slot of a saddle will maintain the pipes in the desired angular relation while the elbow is being fitted and secured in position between the adjacent ends of the pipes.

From the foregoing it will be readily apparent that there has been provided in the present invention a novel instrument for readily determining angles and an instrument having particular value in the setting up and joining together of pipes since with this instrument angles of all kinds can be easily and quickly determined.

I claim:

1. An angle gage comprising three elongated members, means forming a sliding hinge connection between an end of each of two members and the third member, a sliding hinge connection between the other end of one of the two members and the other one of the two members, and the said other one of the two members having a degree scale thereon for coaction with the sliding member connected thereto.

2. An angle gage as set forth in claim 1, with means for positively detachably securing each of the sliding hinge connections with the members engaged thereby.

3. An angle gage as set forth in claim 1, in which the third member has the side opposite from the sliding hinge connections provided with a relatively wide central rib extending lengthwise thereof forming undercut longitudinal side recesses, and the sliding hinge connections engaging the third member having inturned fingers extending across the longitudinal edges of the third member and engaging in the recesses.

4. An angle gage as set forth in claim 1 in which the said one of the two members is of materially less length than the said other one of the two members and the third member and the said one of the two members having a centering mark intermediate its end for coaction with the pivotal center of the sliding hinge connection between the third member and the other one of the said two members.

5. An angle determining means for use in association with two angularly related sections of pipes, comprising a member for application to each pipe section consisting of a pair of resiliently connected arms between which the pipe is engaged, an upwardly opening slot formed between the arms and designed to be disposed over the vertical longitudinal center of the adjacent pipe section and an angle gage having two adjustably coupled bar portions each adapted to be received in one of said slots to extend lengthwise of the adjacent pipe section, a third bar slidably connected at its ends between the first two bars, and a degree scale upon one of the first two bars for coaction with a portion of one end of the third bar to facilitate setting the first two bars at a desired angle.

6. Means for determining the angle between two angularly related pipes, comprising two members each having a joined pair of spring legs between which to receive a pipe, each member having a slot therein to extend longitudinally of the pipe engaged between the leg of the member, and an angle gage comprising two angularly related bars each adapted to engage in a slot of a member.

EDWARD R. DOUGLASS.